J. P. SEITZ.
ATTACHMENT FOR AUTOMOBILE PEDALS.
APPLICATION FILED NOV. 20, 1915.
1,204,499.  Patented Nov. 14, 1916.
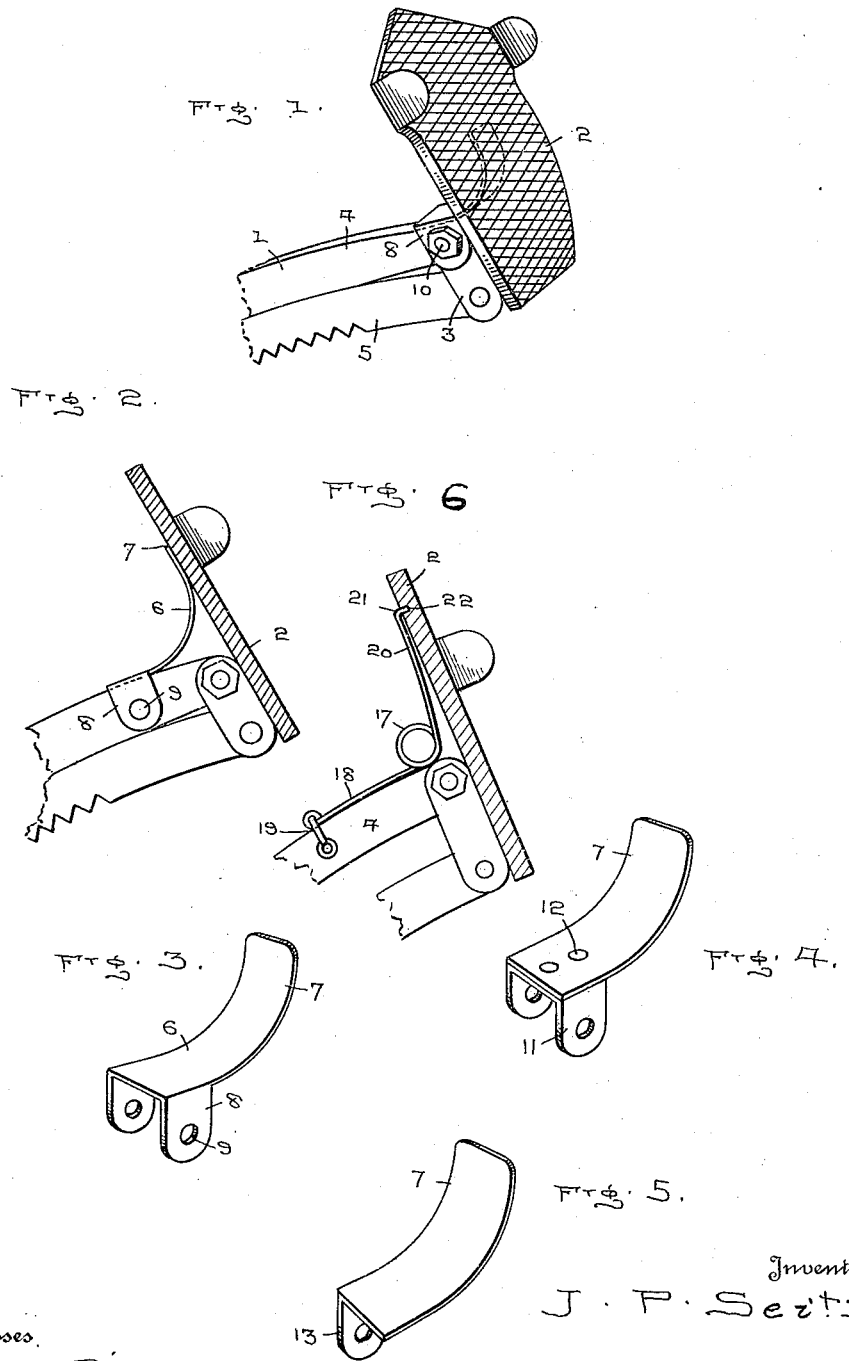

UNITED STATES PATENT OFFICE.

JAMES P. SEITZ, OF WALLA WALLA, WASHINGTON.

ATTACHMENT FOR AUTOMOBILE-PEDALS.

1,204,499.  Specification of Letters Patent.  Patented Nov. 14, 1916.

Application filed November 20, 1915. Serial No. 62,516.

*To all whom it may concern:*

Be it known that I, JAMES P. SEITZ, a citizen of the United States, residing at Walla Walla, in the county of Walla Walla and State of Washington, have invented certain new and useful Improvements in Attachments for Automobile-Pedals; and I do hereby declare the following to be a full, clear, and exact description of the invention, such as will enable others skilled in the art to which it appertains to make and use the same.

My invention relates to new and useful improvements in attachments for automobile pedals and my object is to provide springs for holding the pedals against rattling when the vehicle is in motion.

A further object is to provide means for readily attaching the springs to the arms carrying the pedals. And a further object is to so construct the spring members that they may be attached to different makes of arms and pedals.

Other objects and advantages will be hereinafter set forth and more particularly pointed out in the accompanying specification.

In the accompanying drawings which are made a part of this application, Figure 1 is a perspective view of a portion of the clutch or brake controlling lever and pedal, showing one form of the spring member attached thereto. Fig. 2 is an elevation partly in section of the lever and pedal, showing a different means of attaching the spring member thereto. Fig. 3 is a perspective view of the spring member removed from the lever and pedal. Fig. 4 is a perspective view of a spring member formed in two sections and secured together. Fig. 5 is a perspective view of a modified form of spring member. Fig. 6 is an elevation partly in section showing a different manner of attaching a coil spring to the lever.

Referring to the drawings in which similar reference numerals designate corresponding parts throughout the several views, 1 indicates a lever, such as is commonly employed for operating the clutch or brake upon a motor propelled vehicle, 2 the pedal to receive pressure from the foot of the operator to move said lever and 3 the link fixed to the inner face of the pedal and employed for securing the pedal to the lever. The lever 1 preferably consists of two arms 4 and 5, one end of the link being pivoted to one arm and the opposite end to the other arm.

In order to hold the pedal against rattling when the car is in motion, a spring member 6 is placed in the rear of the pedal, said spring member preferably comprising a flat tongue 7 and ears 8, said ears having registering openings 9 therethrough for the reception of the bolt 10 employed for securing the upper end of the link 3 to the arm 4 of the lever. If preferred, however, the spring member may be attached direct to the arm 4 of the lever, as shown in Fig. 2 of the drawings, or said spring may be attached to any suitable part of the lever, as is most convenient.

In Fig. 4 of the drawings, the tongue 7 is made in one piece and the ears 11 are made in a separate piece and secured to the tongue by means of rivets 12, while in Fig. 5 of the drawings, the tongue 7 is provided with but one ear 13.

In Fig. 6 of the drawings, the spring 17 is coiled at its center, one arm 18 extending longitudinally of the arm 4 of the lever and is looped around the clip 19, said clip being in turn attached to the arm 4, while the arm 20 of the spring 17 is extended upwardly and presses against the inner faces of the pedal 2, said arm 20 preferably having an inturned end 21 which engages the socket 22 in the face of the pedal and owing to the tension of the coil portion of the spring, outward pressure will be directed against the pedal at all times and hold the same from rattling.

I also desire it to be understood that although I have shown and described a particular shaped spring and means of applying the same to the lever and pedal, I do not desire to be confined to the particular construction shown, as the springs may be made of various forms and applied to use in various ways.

Having thus fully described my invention what I claim as new and desire to secure by Letters Patent of the United States, is:—

1. The combination with a lever and a pedal pivoted thereto, of a spring member comprising a tongue adapted to direct pressure against said pedal, depending ears at one end of the tongue, and means to attach the ears to parts of said lever.

2. The combination with a lever and a pedal attached thereto, of a spring member comprising an elongated flat tongue adapted to direct pressure against said pedal, and means to attach the opposite end of the tongue to parts of said lever.

3. The combination with a lever and a pedal attached thereto, of a spring member comprising an elongated flat tongue curved from end to end, one end of the tongue being adapted to direct pressure against the inner face of said pedal, and means to attach the opposite end of the spring to said lever.

In testimony whereof I have signed my name to this specification in the presence of two subscribing witnesses.

JAMES P. SEITZ.

Witnesses:
J. G. THOMAS,
W. A. POWER.

Copies of this patent may be obtained for five cents each, by addressing the "Commissioner of Patents, Washington, D. C."